United States Patent [19]
Alberti et al.

[11] Patent Number: 4,629,656
[45] Date of Patent: Dec. 16, 1986

[54] ION EXCHANGE INORGANIC FILMS MADE UP OF LAYERED STRUCTURE INSOLUBLE ACID SALTS OR TETRAVALENT METALS AND/OR THEIR DERIVATIVES, AND PROCESS FOR THE PREPARATION OF SAME

[75] Inventors: Giulio Alberti; Umberto Costantino, both of Perugia, Italy

[73] Assignee: Consiglio Nazionale Delle Ricerche, Rome, Italy

[21] Appl. No.: 733,407

[22] Filed: May 13, 1985

Related U.S. Application Data

[63] Continuation of Ser. No. 485,342, Apr. 15, 1983, abandoned.

[30] Foreign Application Priority Data

May 17, 1982 [IT] Italy ................................ 48437 A/82

[51] Int. Cl.[4] .......................... C01B 25/00; C08K 1/02
[52] U.S. Cl. .................................... 428/411.1; 423/69; 423/181; 423/266 R; 423/308; 423/309; 423/602; 423/617; 423/618; 428/701; 428/702
[58] Field of Search ..................... 423/69, 181, 266 R, 423/308, 309, 602, 617, 618, DIG. 14; 428/327, 701, 702, 411

[56] References Cited

U.S. PATENT DOCUMENTS

| | | | |
|---|---|---|---|
| 3,384,453 | 5/1968 | Kauders | 423/309 |
| 3,416,884 | 12/1968 | Stynes et al. | 423/309 |
| 3,558,273 | 1/1971 | Beck | 423/308 |
| 3,850,835 | 11/1974 | Marantz et al. | 423/181 |
| 4,376,709 | 3/1983 | Johnson et al. | 423/602 |

OTHER PUBLICATIONS

G. Alberti; Acc. Chem. Res. 11 (1978) 163.
U. Costantino, Chap. III "Inorganic Ion-Exchange Materials" CRC Press USA 1982.
Amphlett C. B.; "Inorganic Ion Exchangers" Elsevier Publishing Co.; New York, Chap. 5.

*Primary Examiner*—George F. Lesmes
*Assistant Examiner*—William M. Atkinson
*Attorney, Agent, or Firm*—Pollock, Vande Sande & Priddy

[57] ABSTRACT

Ion exchange inorganic films made up of alpha-type or gamma-type layered structure insoluble acid salts of tetravalent metals or their salt forms, or their intercalated forms or their organic derivatives containing polar groups. A process for the preparation of said films.

8 Claims, No Drawings

ION EXCHANGE INORGANIC FILMS MADE UP OF LAYERED STRUCTURE INSOLUBLE ACID SALTS OR TETRAVALENT METALS AND/OR THEIR DERIVATIVES, AND PROCESS FOR THE PREPARATION OF SAME

This application is a continuation of application Ser. No. 485,342, filed 4/15/83, now abandoned.

DISCLOSURE OF THE INVENTION

This invention relates to ion exchange inorganic films comprising a closely-packed layered structure made up of very thin exfoliated lamellae of insoluble acid salts of tetravalent metals and/or their derivatives, as well as to a process for the preparation of such films. More particularly, this invention relates to ion exchange inorganic films made up of insoluble acid salts of tetravalent metals corresponding to the general formula $$[M(XO_4)_2]H_2 \cdot nH_2O$$

wherein M is a tetravalent metal such as Zr, Ti, Ce, Sn, X is a pentavalent element such as P or As, and n is 1 or 2, which salts show alpha-type or gamma type layered structures.

Moreover, the process or the preparation of said films, which is an integral part of this invention, allows the preparation of films made up of the salt forms, the intercalated forms of such acid salts or of some of their inorganic derivatives containing polar groups such as zirconium carboxymethan- and carboxyethanphosphonate.

As is well known, insoluble acid salts of tetravalent metals, and in particular zirconium acid phosphate, were investigated and are at the present time also actively studied in many national and foreign laboratories because of their potential applications in the field of ion exchange, of heterogeneous catalysis, of intercalation, as well as in the fields of the chromatographic supports and of solid electrolytes.

The large amount of experimental work performed up to the present time has been summarized and discussed in some recent papers and review works concerning in particular the preparation methods, properties and appplications (see for instance G. Alberti in Acc. Chem. Res., 11, 163 (1978); Clearfield Ed. Inorganic Ion Exchange Materials C.R.C. Press U.S.A., 1982, Chapters I, II, III; G. Alberti and U. Costantino, Chapter V of "Intercalation Chemistry", (Whittingham and Jacobson, Editors), Academic Press, U.S.A., 1982).

It is to be observed that crystals of insoluble acid salts result from the packing of planar polymeric macromolecules of the composition $$[M(XO_4)_2]_nH_{2n}$$

and that the various organic compounds containing groups which can interact with acid protons (as for instance amines, $H_2O$, alcohols, etc.) can be intercalated between the layers (see for instance, Chapters III and V of the above references).

As regards the technologies reported above, this invention aims at realizing a process for the preparation of said acid salts in the form of thin films, whose thickness can be lower than 10 microns.

To that aim, according to the invention, an organic molecule bearing both a proton-acceptor and a hydrophobic group (e.g. propylamine and methylamine) is intercalated between the exchanger layers in the presence of a polar solvent such as water. The intercalation process results in a remarkable increase in the interlayer distance and consequently in the weakening of the forces which keep the layers together in the crystal. Thus the solvent also penetrates between the layers so that such forces are further weakened and, with vigorous stirring, crystals exfoliate; a jelly-like slurry is so obtained containing the acid salt in a state of extreme dispersion, partially or totally transformed by the organic base into the salt. The suspension as it is obtained or after addition of a mineral acid in order to obtain again hydrogen form of the starting materials, can be employed for the preparation of ion exchange thin films and/or for covering materials of various types (plastic matter, metals, glass, etc.) with an extremely thin layer of the acid salt present within the suspension.

It is to be remarked that in the process according to the invention it is of no importance the employment of different solvent/acid salt ratios in order to obtain a suspension. Indeed, the choice of a suitable ratio will allow the preparation of suspensions of a desired concentration of the suspended material and therefore the obtainment of films of different thicknesses. Moreover, the kind of mineral acid or of mineral acid mixtures is also of no importance as regards the obtainment of acid form regeneration. However, a phosphoric acid solution is preferable to that aim, in order to avoid the possible hydrolytic loss of the phosphate groups in the zirconium and titanium acid phosphates.

Washing for the removal of excess electrolytes in the acidified suspension can also be carried out on the suspension as it is obtained as well as on the preformed film by percolating distilled water.

The acid salt films in the saline form can be obtained by treatment of either the film or the suspension with solutions containing the ion to be exchanged, according to the standard ion exchange procedures. In addition to percolation, according to what will be described in example 10, the procedure can be followed of the successive contacts or the procedure of the titration in the case of existence of the soluble base of the exchanging cation. In addition to the sodium form, the films can also be prepared in various other saline forms, such as for instance in the forms with the alkaline metals, earth-alkaline metals, transition metals ions etc., converting the exchanger into the desired saline form by means of the methods to be found in the technical literature. At last, it is possible to employ other amine or proton-acceptor polar molecules and/or other polar solvents in order to obtain the swelling of the insoluble acid salt crystals and/or their derivatives. The properties of films obtained according to the invention can be varied by the addition of suitable compounds such as for instance cellulose pulp, polyethylene fluoride powders, polyethylene, etc., dispersed within suitable solvents. The firmness of the films can be modified by means of certain suitably chosen operations such as the filtration of the suspension with vibration; calendering of the films; pressing of the films, etc. Sheets are obtained of a firmness similar to that of cardboard by pressing a number of films. Heat treatments can also modify the film properties both because the water concentration of the material is varied and because the mechanical properties are modified of the film itself such as its flexibility and tensile strength.

For instance, it was found that films of zirconium acid phosphate when heated up to various temperatures between 110° and 750° C. for different times keep unaltered their film aspect whereas their flexibility decreases. It is to be remembered that zirconium phosphate at 110°–200° C. completely loses its hydration water, whereas at 350°–500° C. it loses its condensation water, transforming into zirconium pyrophosphate. Films keep their integrity when dipped into solvents such as methyl alcohol, acetone and chloroform.

It is to be remarked that the film resistance in water is lower than in the solvents reported above. The employment of the films or of materials covered with films of insoluble acid salts and/or of their derivatives is clearly imposed both by their physical characteristics and by the chemical properties of the active material, such as its resistance to the acid and/or oxidating chemical agents, its resistance to temperature, its ion exchange and catalytic properties. For instance, glass capillary tubes internally covered with such films can be employed as active columns of gaschromatographic separations. Films made up of tetravalent metals acid salts or their saline forms containing active metals as the exchanged ions for heterogeneous catalysis such as Cu, Ag, Rd, Pd, etc. could be employed as catalysts in chemical syntheses reactors. Chromatographic properties of thin layers of silicagel or of cellulose or of other supports can be modified by the presence of such films adhered to them. For instance, photochemically active substrates, such as dyes, porphyrins, transition metals complex compounds etc. can be anchored by means of chemical or physicochemical bond formation to films of zirconium acid phosphate, in order to obtain supports for use in the field of light-induced redox reactions.

Films which are the object of this invention could also be employed as ion exchange membranes, ultrafiltration membranes and as membranes for the separation of gas mixtures.

Thus, it is a specific object of this invention to provide an ion exchange inorganic film made up of tetravalent metal insoluble acid salts, with an alpha-type, or a gamma-type layered structure of the general formula:

$$[M(XO_4)_2]H_2 \cdot nH_2O$$

wherein M is a tetravalent metal such as Zr, Ti, Ce, Sn, X is a pentavalent element such as P or As, and n is 1 or 2.

As it was already pointed out, the saline forms, the intercalated forms or the organic derivatives containing polar groups of said acid salts are all included in the protection scope of this invention.

This invention also relates to the process for the preparation of said films, which is substantially characterized in that the starting crystalline material is exfoliated following the intercalation of molecules of organic ions containing a proton-acceptor group and a hydrophobic group and following the swelling of crytals by the action of a polar solvent such as water, and the suspension obtained as a result of crystal swelling and exfoliation is filtered through a planar filter and then removed from the filter itself in the form of an inorganic film which is of sufficient flexibility and whose thickness depends on the amount of suspension, on the concentration in the latter of the active material and on the filter surface. Details of preparation of acid salt films with a layered structure and/or their derivatives are reported in the following examples which are to be understood as descriptive of some embodiments of the invention with no limitations of its spirit and scope. The most relevant acid salts according to this invention are zirconium phosphate, zirconium arsenate, titanium (IV) phosphate and zirconium carboxymethanphosphonate. As the best results were obtained by using zirconium acid phosphate, the examples shown are mainly concerned with such ion exchanger. Moreover, in the following examples reference will be made to zirconium phosphate prepared according to different methods. Films obtained from zirconium phosphate intercalated with methylamine or propylamine and/or regenerated in the acid form show to be the best ones as regards their physical characteristics (compactness, flexibility and adherence).

For the sake of clearness of description, the following list is shown of materials employed in the preparation of films.

Materials employed

I—Microcrystals of $\alpha\text{-}[Zr(PO_4)_2]H_2 \cdot H_2O$ prepared according to the method of prolonged boiling under reflux of amorphous zirconium phosphate in phosphoric acid solutions, as described by A. Clearfield and J. A. Stynes, J. Inorg. Nucl. Chem. 26, 117 (1964).

Microcrystals obtained by boiling amorphous zirconium phosphate for 100 hr in 10M phosphoric acid show average areas of 0.05–0.01 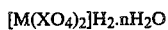.

II—Microcrystals of $\alpha\text{-}[Zr(PO_4)_2]H_2 \cdot H_2O$, prepared according to the low decomplexing method by evaporation of the hydrofluoric acid, of zirconium hydrofluoric complex compounds present in a solution containing phosphoric acid, as described by G. Alberti and E. Torracca, J. Inorg. Nucl. Chem., 30, 317 (1968).

Microcrystals observed by means of an electron microscope show in the form of hexagonal platelets and/or triangular platelets, of average areas between 70 and 100 $\mu m^2$.

III—Crystals of $\alpha\text{-}[Zr(PO_4)_2]H_2 \cdot H_2O$ prepared according to the slow decomplexing procedure by the action of a slow and gradual increase in temperature, of hydrofluoride complex compounds of zirconium in a solution containing phosphoric acid, as described by G. Alberti, U. Costantino and R. Giulietti, J. Inorg. Nucl. Chem., 42, 1062 (1980).

Crystals, which are visible with the naked eye or with an optical microscope, show in the form of hexagonal prisms of surface area between 1 and 10 mm² and thickness between 0.01 and 0.05 mm.

IV—Microcrystals of $\gamma\text{-}[Zr(PO_4)_2]H_2 \cdot 2H_2O$ prepared according to the method of the prolonged boiling of amorphous zirconium phosphate in a solution containing phosphoric acid and mono-sodium phosphate, according to the procedure described by A. Clearfield, R. H. Blessing and J. A. Stynes, J. Inorg. Nucl. Chem., 30, 2249 (1968). Microcrystals have average sizes of 0.5–1 $\mu m^2$.

V—Microcrystals of $\alpha\text{-}Zr(HOOC\text{-}CH_2PO_3)_2$ prepared according to the decomplexing procedure of zirconium hydrofluoride complex compounds which are present in a solution containing the ethyl ester of carboxymethanphosphonic acid, according to the method described by G. Alberti, U. Costantino and M. L. Luciani, J. Chromatog., 180, 45 (1979).

VI—Microcrystals of $\alpha\text{-}[Ti(PO_4)_2]H_2 \cdot H_2O$ prepared according to the slow decomplexing method by hydrofluoric acid evaporation, of titanium (IV) hydrofluoride complex compounds, in a solution containing phosphoric acid as described by G. Alberti, U. Costantino and M. L. Luciani, J. Inorg. Nucl. Chem., 41, 643 (1979). Microcrystals have average sizes of 0.05–0.1 µm².

VII—Microcrystals of $\alpha$-$[Zr(AsO_4)_2]H_2 \cdot H_2O$ prepared according to the slow decomplexing method, by evaporation of hydrofluoric acid, of zirconium hydrofluoride complex compounds in a 6M arsenic acid solution.

EXAMPLE 1

(a) Preparation of the zirconium phosphate suspension containing propylammonium ion 1 g of type II $\alpha$-$[Zr(PO_4)_2]H_2 \cdot H_2O$ is dispersed in 170 ml of distilled water at room temperature. 33.2 ml of a 0.10M propylamine aqueous solution is added slowly (at about 0.5 ml/min) to this dispersion under vigorous stirring (as for instance by means of a magnetic stirrer). Propylamine reacts with zirconium phosphate forming an intercalation compound containing 1 mole of propylamine per mole of zirconium phosphate according to the reaction:

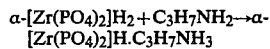
$\alpha$-$[Zr(PO_4)_2]H_2 + C_3H_7NH_2 \rightarrow \alpha$-
$[Zr(PO_4)_2]H \cdot C_3H_7NH_3$ In the course of the addition, microcrystals visibly swell and they exfoliate so that, at the end of the addition, they are completely dispersed within the solution, and they give of the solution itself the aspect of a gelatinous suspension. Microcrystals do not settle even after a long time (for instance 1 week), but they can be separated from the solution by centrifugation or by filtration with a suitable porosity filter (e.g. G.3; average pores diameters 16–40 µm).

(b) Preparation of zirconium phosphate films containing propylammonium as the intercalated ion A part of the suspension obtained according to the procedure in (a), is slowly filtered on a plane filter of a porous plastic material carried by a suitable support. After filtration the filter covered with the layered product which was already present within the suspension is air dried or it is dried in a desiccator. After drying, the product is removed from the filter in the form of a translucid, compact film, which shows somewhat flexible and whose thickness depends on the amount of suspension employed, as well as on the concentration of the suspended material and on the filter surface.

(c) Preparation of the zirconium acid phosphate suspension 50 ml of a 0.1M HCl water solution are added slowly and with vigorous stirring to the suspension prepared according to the method described in (a). During addition the propylammonium ion is substituted by the hydrogen ion between the zirconium phosphate layers by means of an ionic exchange process which can be represented by the reaction:

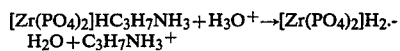
$[Zr(PO_4)_2]HC_3H_7NH_3 + H_3O^+ \rightarrow [Zr(PO_4)_2]H_2 \cdot H_2O + C_3H_7NH_3^+$ so that the hydrogen form is obtained of the exchanger. At the end of the addition the $[Zr(PO_4)_2]H_2 \cdot H_2O$ microcrystals are in the disperse state and they have a tendency to sedimentation in part, though slowly, as a result of the action of the electrolytes present in the solution. The suspension obtained after the addition of the HCl solution is separated from the solution (e.g. by 2000 gpm centrifugation) and again dispersed in distilled water. The electrolyte can be completely removed by repeating this treatment a number of times.

(d) Preparation of zirconium acid phosphate films

Zirconum acid phosphate films can be prepared by a procedure similar to that described in (b), employing a suspension prepared according to the method described in (c). Thus, a compact, nacreous and rather flexible film is obtained, whose thickness depends on the amount of the suspension employed, on the concentration of suspended zirconium phosphate, as well as on the filter surface.

(e) Covering of suitable supports with inorganic films made up of zirconium phosphate or its derivatives (1) The suspension prepared according to the description in (a) or in (c) is sprayed uniformly by means of a suitable spraying device (for instance, a chromatography spraying unit) onto a glass or metal flat plate. After air drying, the plate shows covered with a compact film of the inorganic ion exchanger, tightly adhering to the surface.

(2) The suspension prepared according to the description in (c), is percolated for a number of times through a glass capillary tube, 20 cm length and 1 mm inside diameter. Following this treatment, the suspended product is deposited onto the inside surface of the capillary tube. After air drying, the inside surface of the capillary tube is covered with a thin, compact and adherent film of zirconium acid phosphate.

(3) The suspension described in (a) and (c) is poured or sprayed onto a non porous plastic sheet (e.g. a polyethylene or a PVC sheet, etc.). Following drying, the plastic sheet shows covered with the inorganic film. If such film is not too thin, it can be detached from the support owing to the weak cohesion forces between the plastic material and the ion exchanger.

EXAMPLE 2

1 g of type II $\alpha$-$[Zr(PO_4)_2]H_2 \cdot H_2O$ microcrystals was dispersed into 70 ml of water and 33.2 ml of a 0.20M methylamine water solution was slowly added ($\approx$ 1 ml/min.) with vigorous stirring to the dispersion. Methylamine was adsorbed by zirconium phosphate so as to form an intercalation compound containing 2 moles of methylamine per mole of zirconium phosphate. At the end of the addition the solution takes on the aspect of a viscous gel, similar to that described in example 1-(a). In this case also the crystals do not deposit even after a long time, and they can be separated from the solvent by filtration through a suitable porosity filter.

Compact and translucid zirconium phosphate films containing methylammonium as the intercalated ion were obtained following a procedure similar to that of example 1-(b). 40 ml a 0.20M hydrochloric acid water solution was added with vigorous stirring to the suspension obtained according to the method described above. Methylammonium ion is substituted with hydrogen ion and the acid form is obtained of zirconium phosphate. Microcrystals which exfoliated as a result of intercalation process and of solvent swelling, keep suspended. The suspension treated according to a procedure substantially similar to that described in example 1-(d) gives a zirconium phosphate film of consistency and aspect very similar to those described in example 1-(d).

EXAMPLE 3

32.4 ml of a 0.10M propylamine water solution was metered into a dispersion of 1 g type III α-[Zr(PO$_4$)$_2$]H$_2$.H$_2$O crystals in 100 ml H$_2$O, by means of an automatic metering device dispensing 0.1 ml/min. A suspension is obtained similar to that described in example 1-(a) but which shows thicker. Following procedures substantially similar to those described in example 1-(b), -(c) and -(d), zirconium phosphate films containing propylammonium as the intercalated ion as well as zirconium acid phosphate films were obtained. The films show both consistencies and flexibilities higher then those described in examples 1 and 2, probably as a result of the remarkable sizes of the zirconium phosphate crystals employed.

EXAMPLE 4

1 g of type I α-[Zr(PO$_4$)$_2$]H$_2$.H$_2$O microcrystals was treated according to the procedure described in example 1-(a). The suspension was treated according to the method described under (c) and (d) in example 1, so that a zirconium acid phosphate film is obtained.

Such film shows less consistent and brittler than films obtained according to examples 1, 2 and 3, probably because of the very highly subdivided state of microcrystals employed.

EXAMPLE 5

31.4 ml of a 0.10M propylamine water solution was slowly added (10 ml/min.) with stirring to a dispersion of 1 g of γ-[Zr(PO$_4$)$_2$]H$_2$.H$_2$O microcrystals of type IV in 100 ml H$_2$O. A suspension is obtained of aspect similar to those described in previous examples which, when treated with a 0.10M HCl solution and filtered following procedures similar to those described under (c) and (d) in example 1, gives a type γ zirconium acid phosphate film which is however much brittler than films obtained in previous examples.

EXAMPLE 6

33.2 ml of a 0.200M methylamine solution in methanol is added to 1 g of type II γ-[Zr(PO$_4$)$_2$]H$_2$.H$_2$O Microcrystal dispersed in 100 ml of anhydrous methanol. The intercalation reaction leads to the formation of the compound of the formula α-[Zr(PO$_4$)$_2$](CH$_3$NH$_3$)$_2$.H$_2$O with no observable exfoliation of crystals. The product separated from the solution is allowed to dry in the air.

0.5 g of zirconium phosphate containing the methylammonium ion, prepared as described above, is dispersed in to 100 ml of distilled water with vigorous stirring. In the presence of water, microcrystals swell visibly and they exfoliate. Thus, a suspension is obtained similar to that described in example 2. Zirconium phosphate films containing the methylammonium ion as well as zirconium acid phosphate films were obtained following procedures similar to those employed in the same example, such films showing similar consistencies and flexibilities.

EXAMPLE 7

13.6 ml of a 0.20M propylamine water solution was slowly added with stirring to 1 g of type V α-Zr(HOOCCH$_2$PO$_3$)$_2$ microcrystals dispersed in 100 ml of water. Amine becomes intercalated, so that an intercalation compound is obtained containing 1 mole of propylamine per mole of zirconium carboxymethanphosphonate. In this case also microcrystals swell and exfoliate, so that a gelatinous suspension is obtained. 40 ml of 0.10M HCl is then slowly added to the suspension, so that the hydrogen form is obtained again of the compound. Microcrystals keep suspended, and they are filtered through a porous plastic filter so that they deposit in the form of layers which make up a nacreous, compact film which is less flexible than films obtained with type II and type III zirconium phosphate.

EXAMPLE 8

40 ml of a 0.20M propylamine solution is slowly added with stirring to 1 g of type VI α-[Ti(PO$_4$)$_2$].H$_2$O dispersed in 100 ml H$_2$O. A suspension is obtained of gelatinous aspect which settles at a higher rate with respect to suspensions obtained with zirconium phosphate.

Following procedures substantially similar to those described under (d), (c) and (b) in example 1, titanium phosphate films containing propylammonium as the intercalated ion as well as titanium acid phosphate films were obtained. However such films show of little consistency (probably because of the small sizes of the starting microcrystals). Moreover, both chemical and X-ray diffraction analyses showed that titanium acid phosphate had lost a considerable amount (about 15%) of the phosphate groups and a part of its crystalline state.

EXAMPLE 9

21 ml of a 0.25M ethylamine solution is slowly added with stirring to a dispersion of 1 g of type VII α-[Zr(AsO$_4$)$_2$]H$_2$.H$_2$O crystals in 180 ml of water. A gelatinous suspension is obtained which, when treated substantially following the same procedures described under (b), (c) and (d) in example 1, gives zirconium arsenate films containing ethylammonium as the intercalated iion or it gives zirconium acid arsenate films. Such films, though less friable than those made up of titanium phosphate, yet show physical properties less valuable than those of films obtained from zirconium phosphate.

EXAMPLE 10

A circular film of zirconium acid phosphate, obtained according to example 1, 7 cm diameter and 0.240 g weight, is placed onto a porous ceramic filter of the same diameter. 200 ml of a 0.10M NaCl-0.01M NaOH solution is percolated through the film. During percolation the zirconium acid phosphate undergoes the substitution of the phosphate group hydrogen with sodium ion through an ionic exchange process, so that hydrogen reacts with the hydroxyl groups present in the solution according to the reaction

[Zr(PO$_4$)$_2$]H$_2$+2Na$^+$+2OH$^-$⇌[Zr(PO$_4$)$_2$]Na$_2$+2-H$_2$O wherein the hydration water of the complex compounds were not considered. When percolation has been completed, the film which kept integral is washed by filtration with fraction of a few ml of distilled water and let to dry in the air. After drying a compact zirconium phosphate film is obtained of the sodium form, which is slightly brittler than the starting film.

This invention has been described by means of the examples above, with particular reference to some of its specific embodiments; however it is to be understood that changes and modifications can be made in the invention within the scope and spirit of the same.

We claim:

1. A process for preparing compact inorganic ion-exchange films formed by an aggregation of very thin lamellae of α- or γ-layered phosphates or phosphonates of tetravalent metals of the general formula $$M(RPO_3)_2 \cdot nH_2O$$

where M is selected from the group consisting of Zr, Ti and Sn; R is selected from the group consisting of —OH, —CH$_2$COOH and —C$_2$H$_4$COOH; and n is 1 or 2, comprising the following steps:

(a) providing crystals of said α- or γ-layered phosphates or phosphonates;

(b) exfoliating said layered crystals into lamellae sufficiently thin to give a colloidal suspension in water by intercalating polar organic molecules or organic ions into the interlayer region of said layered crystals, said polar organic molecules or organic ions being selected from the group consisting of methylamine, ethylamine, and propylamine, said intercalation being carried out to a degree of about one mole of methylamine or ethylamine or about one-half mole of propylamine per mole of phosphate or phosphonate, said intercalation further being carried out in water while stirring;

(c) depositing a layer of the resulting colloidal suspension of lamellae onto a solid surface; and (d) drying said layer to form a compact film of an inorganic ion exchanger.

2. The process of claim 1 wherein a layer of colloidal lamellae in amine or hydrogen form of the inorganic ion-exchanger is deposited onto a solid surface by spraying or by painting said surface with a suspension of said colloidal lamellae or by dipping a solid into said suspension until colloidal lamellae in an amount sufficient to form a film has adhered to the surface of said solid.

3. The process of claim 1 wherein the solid which form said solid surface in step (c) is selected from glasses, metals and organic polymers.

4. The process of claim 1 wherein compact self-consistent and flexible inorganic ion-exchange films are recovered by painting or spraying the colloidal suspension on a flat surface then drying and detaching the resulting compact film which was produced on the solid.

5. The process of claim 1 wherein the lamellae in amine form are regenerated in hydrogen form of the inorganic ion exchangers by adding a mineral acid to the colloidal suspension.

6. The process in accordance with claim 1 wherein said dried film is removed from said solid surface as a compact film.

7. The process in accordance with claim 1 wherein said intercalating molecules are propylamine.

8. A compact inorganic film made in accordance with the process of claim 1.

* * * * *